US010573142B2

(12) United States Patent
Geng et al.

(10) Patent No.: US 10,573,142 B2
(45) Date of Patent: Feb. 25, 2020

(54) SURVEILLANCE CAMERA HAVING INTEGRATED ASSEMBLY FEATURES

(71) Applicants: Pelco, Inc., Clovis, CA (US); Junwei Geng, Shanghai (CN)

(72) Inventors: Junwei Geng, Shanghai (CN); Greg Max Millar, Coaresgold, CA (US); Richard Todd Boswell, Fresno, CA (US); Vincent Wong, Shanghai (CN)

(73) Assignee: Pelco, Inc., Fresno, CA (US)

( * ) Notice: Subject to any disclaimer, the term of this patent is extended or adjusted under 35 U.S.C. 154(b) by 0 days.

(21) Appl. No.: 14/787,757

(22) PCT Filed: Apr. 21, 2014

(86) PCT No.: PCT/CN2014/075816
§ 371 (c)(1),
(2) Date: Oct. 28, 2015

(87) PCT Pub. No.: WO2014/176995
PCT Pub. Date: Nov. 6, 2014

(65) Prior Publication Data
US 2016/0086461 A1   Mar. 24, 2016

(30) Foreign Application Priority Data

Apr. 28, 2013 (CN) .......................... 2013 1 0155844

(51) Int. Cl.
*G08B 13/196* (2006.01)
*H04N 5/225* (2006.01)
*H04N 7/18* (2006.01)

(52) U.S. Cl.
CPC ... *G08B 13/1963* (2013.01); *G08B 13/19619* (2013.01); *H04N 5/2251* (2013.01); *H04N 7/183* (2013.01)

(58) Field of Classification Search
CPC .......... G08B 13/1963; G08B 13/19619; H04N 5/2251; H04N 7/183
See application file for complete search history.

(56) References Cited

U.S. PATENT DOCUMENTS

| 4,687,170 A | 8/1987 | Beaver |
| 5,562,357 A | 10/1996 | Sandell |

(Continued)

FOREIGN PATENT DOCUMENTS

| CN | 1254856 A | 5/2000 |
| CN | 1294309 | 5/2001 |

(Continued)

OTHER PUBLICATIONS

International Preliminary Report on Patentability for International Application No. PCT/CN2014/075816, "Surveillance Camera with Integrated Mounting Feature", dated Nov. 12, 2015.

(Continued)

*Primary Examiner* — Mekonnen D Dagnew
(74) *Attorney, Agent, or Firm* — Tutunjian & Bitetto, P.C.

(57) ABSTRACT

A surveillance camera system having a specialized camera assembly with a fixed-angle lens is provided in a housing designed to reduce the size and weight of the camera assembly and reduce the identifiability of the system as a surveillance camera. The camera assembly can include an integrated ball joint assembly to support the camera assembly at arbitrary angles. The ball joint can further provide a standard threaded mating component to secure the camera assembly. The surveillance camera system can employ a recessed housing partially shrouding the camera assembly in a ceiling installation and further reducing the observability of the camera assembly without obstructing the camera lens. Installed in the recessed housing with an integrated ball joint, the camera assembly retains pan and tilt adjustments common to current recessed dome surveillance cameras.

(Continued)

The camera assembly supports attachment of a customizable front cover further obscuring the camera assembly.

10 Claims, 17 Drawing Sheets

(56) References Cited

U.S. PATENT DOCUMENTS

| | | | |
|---|---|---|---|
| 5,931,432 | A | 8/1999 | Herold |
| 6,249,310 | B1 * | 6/2001 | Lefkowitz ........ G08B 13/19619 348/143 |
| 6,328,270 | B1 | 12/2001 | Elberbaum |
| 6,502,792 | B1 | 1/2003 | Cho et al. |
| 8,711,216 | B2 * | 4/2014 | Chien .................. H04N 5/2354 348/142 |
| 8,848,101 | B2 | 9/2014 | Zarpellon |
| 2003/0227548 | A1 * | 12/2003 | Kawakami ............. H04N 7/183 348/152 |
| 2005/0117052 | A1 | 6/2005 | Willes |
| 2005/0146641 | A1 * | 7/2005 | Cheng .................. H04N 5/2256 348/373 |
| 2005/0247865 | A1 * | 11/2005 | Takach .................... G01D 5/34 250/239 |
| 2005/0250562 | A1 * | 11/2005 | Carroll ................ H04M 1/0214 455/575.3 |
| 2007/0262259 | A1 | 11/2007 | Wu et al. |
| 2008/0210832 | A1 * | 9/2008 | Speggiorin ............. F16M 11/14 248/183.1 |
| 2009/0284596 | A1 * | 11/2009 | Lin ...................... H04N 5/2252 348/143 |
| 2010/0002071 | A1 * | 1/2010 | Ahiska ................... H04N 5/217 348/36 |
| 2010/0103116 | A1 | 4/2010 | Leung |
| 2010/0208068 | A1 | 8/2010 | Elsemore |
| 2010/0329661 | A1 * | 12/2010 | Cuddeback ............ G03B 17/04 396/299 |
| 2011/0102587 | A1 * | 5/2011 | Zittel ..................... H04N 7/183 348/143 |
| 2012/0006870 | A1 * | 1/2012 | Proctor .................. B60R 11/02 224/275 |
| 2012/0263450 | A1 * | 10/2012 | Totani .................... B60R 11/04 396/428 |
| 2013/0155233 | A1 * | 6/2013 | Dahlqvist .............. H04N 5/225 348/143 |

FOREIGN PATENT DOCUMENTS

| | | |
|---|---|---|
| CN | 101160957 | 4/2008 |
| CN | 201114374 Y | 9/2008 |
| CN | 201228836 Y | 4/2009 |
| CN | 201377662 | 1/2010 |
| CN | 101680784 | 3/2010 |
| CN | 201893873 | 7/2011 |
| CN | 102537606 | 7/2012 |
| EP | 0990833 | 4/2000 |
| EP | 1008973 A1 | 6/2000 |
| EP | 1381002 | 1/2004 |
| EP | 2216985 A1 | 8/2010 |

OTHER PUBLICATIONS

English Language Machine Translation of Chinese Patent Application Publication No. CN102537606 dated Jul. 4, 2012, 20 pages.
English Language Machine Translation of Chinese Patent Application Publication No. CN101680784 dated Mar. 24, 2010, 15 pages.
English Language Machine Translation of Chinese Patent Application Publication No. CN101160957 dated Apr. 9, 2008, 18 pages.
English Language Machine Translation of Chinese Patent Application Publication No. CN201893873 dated Jul. 6, 2011, 9 pages.
English Language Machine Translation of Chinese Patent Application Publication No. CN1294309 dated May 9, 2001, 11 pages.
English Language Machine Translation of Chinese Patent Application Publication No. CN201377662 dated Jan. 6, 2010, 8 pages.
Chinese Search Report for Chinese Patent Application No. 2013101558449 dated Apr. 12, 2018, 3 pages.
European Examination Report for European Patent Application No. 14791411.3 dated Jan. 23, 2018, 4 pages.
Extended European Search Report for European Patent Application No. 14791411.3 dated Jan. 9, 2017, 12 pages.
English Language Machine Translation of European Patent Publication No. 0990833 published on Apr. 5, 2000, 8 pages.
European Sear Report for European Application No. EP 14791411 "Surveillance Camera Having Integrated Assembly Features" dated Sep. 27, 2016.

* cited by examiner

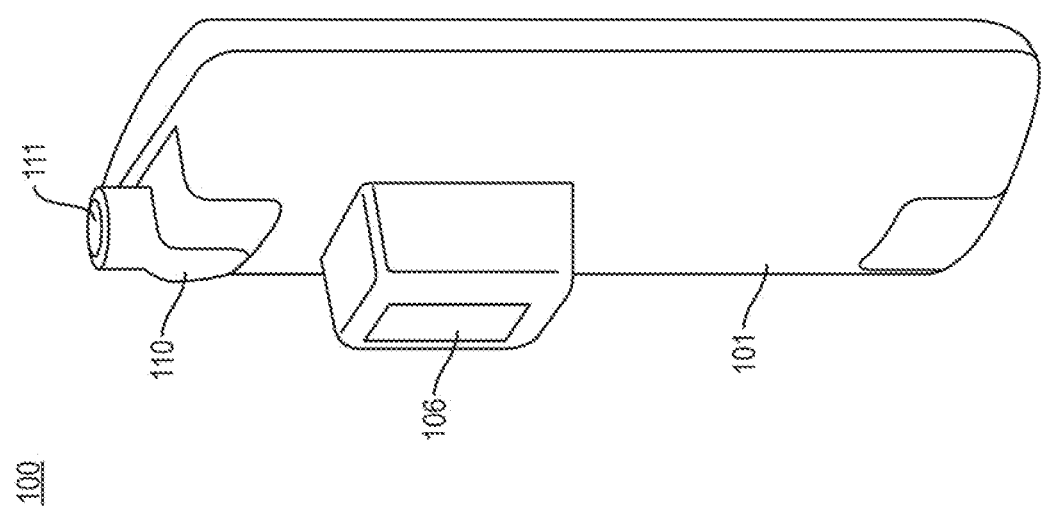

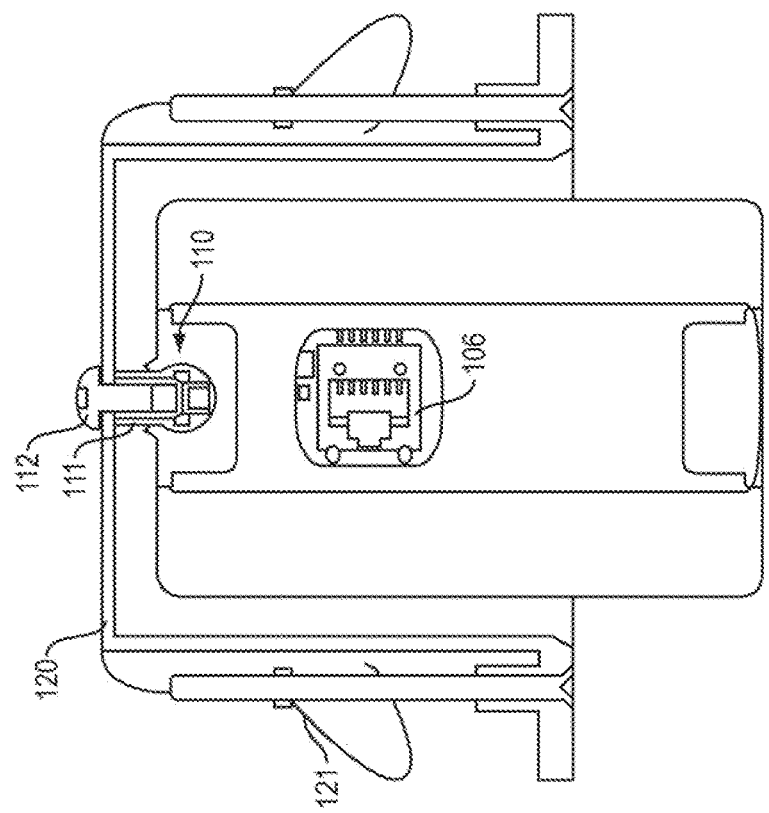
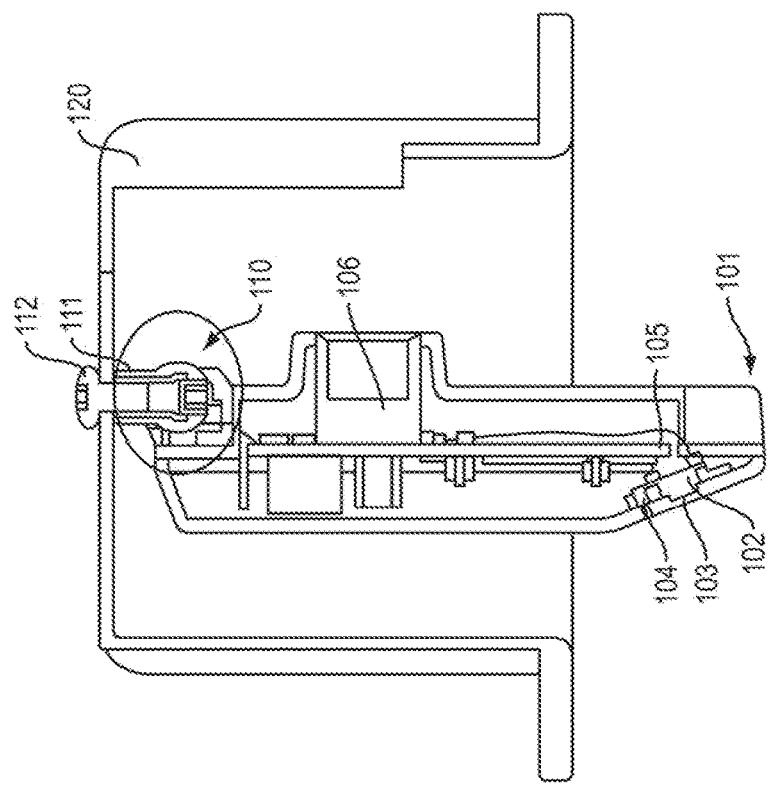

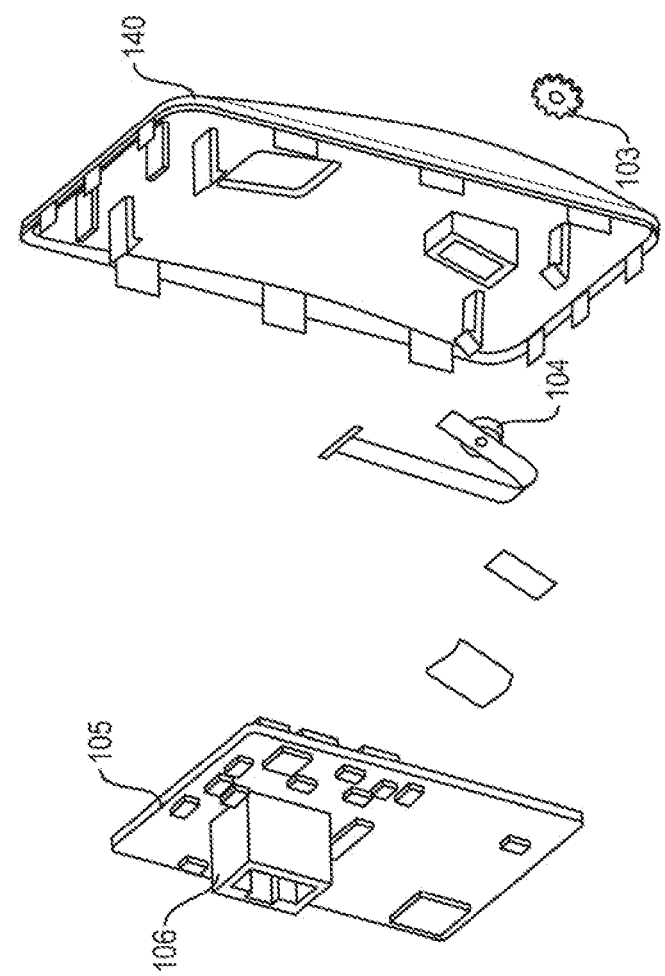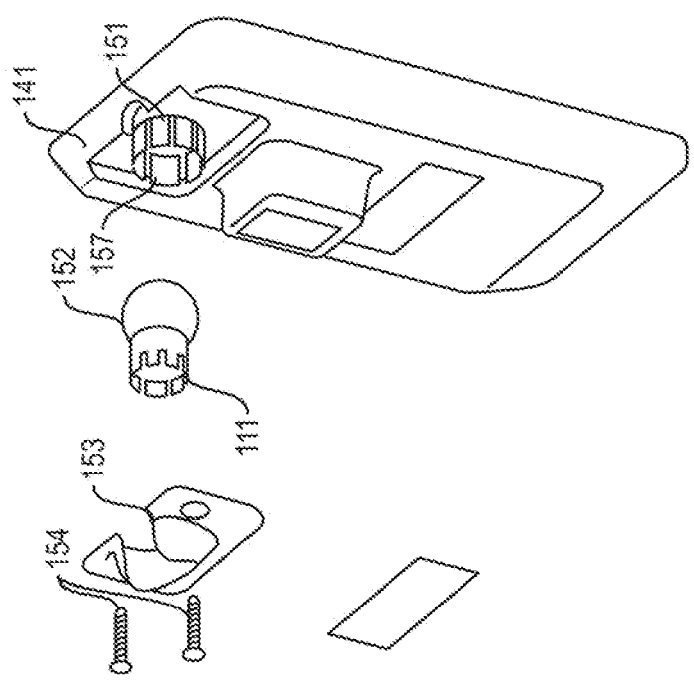
FIG. 5

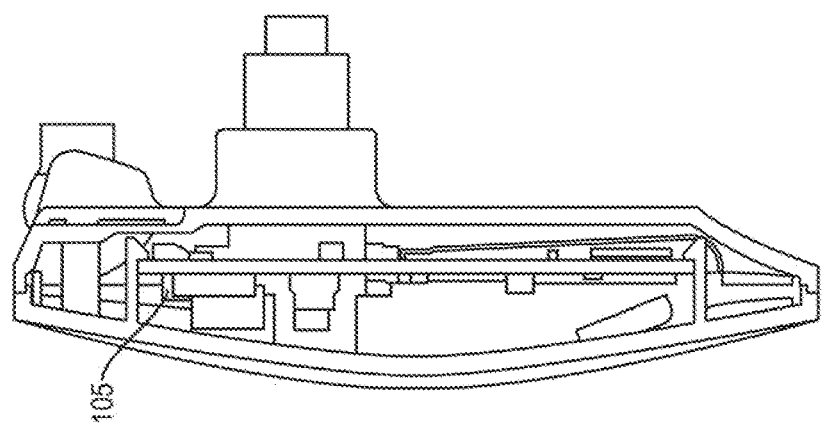
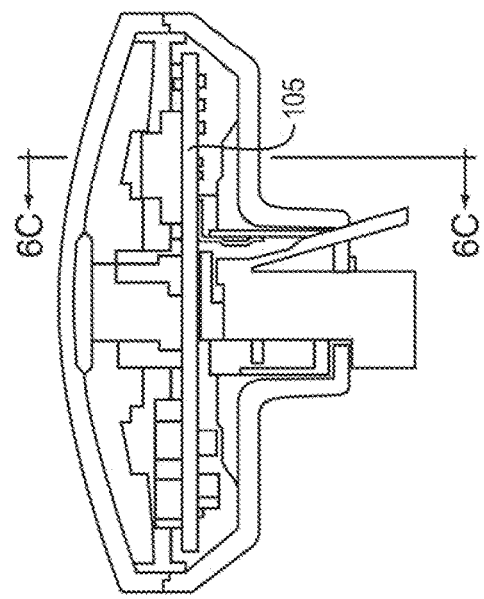
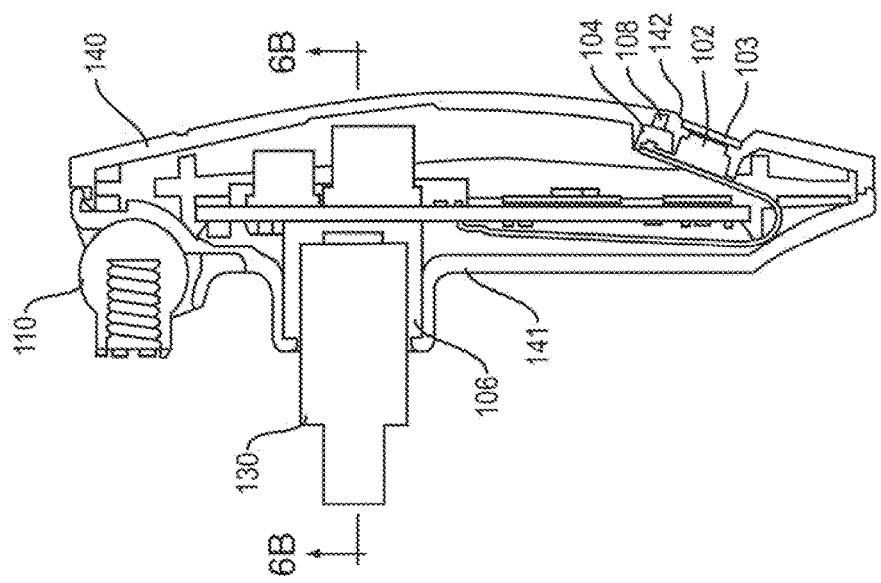

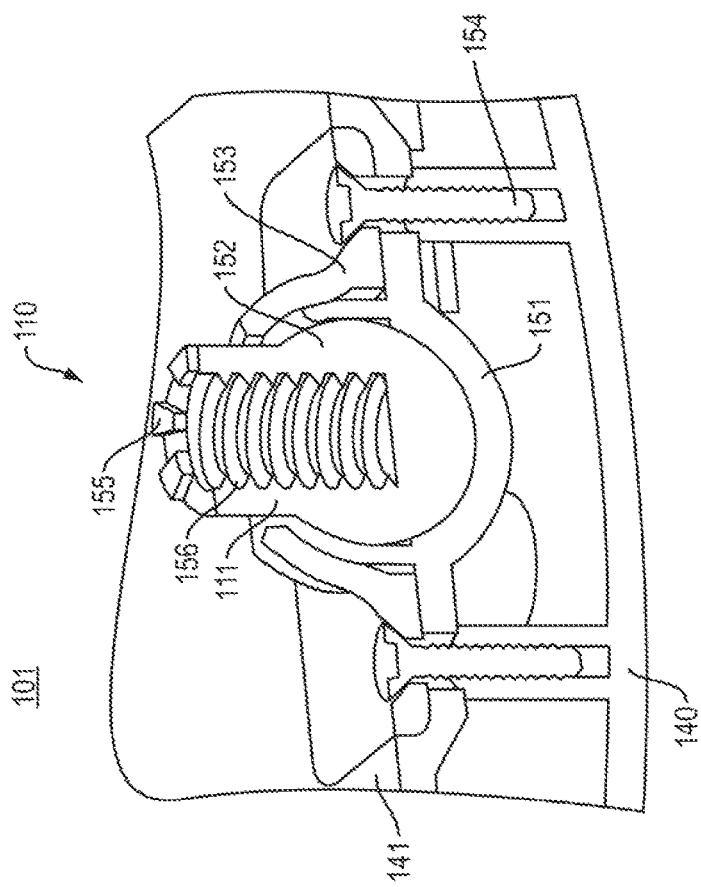
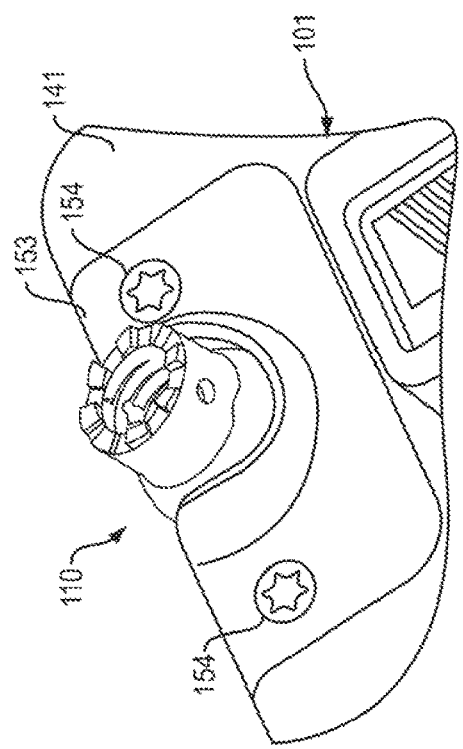

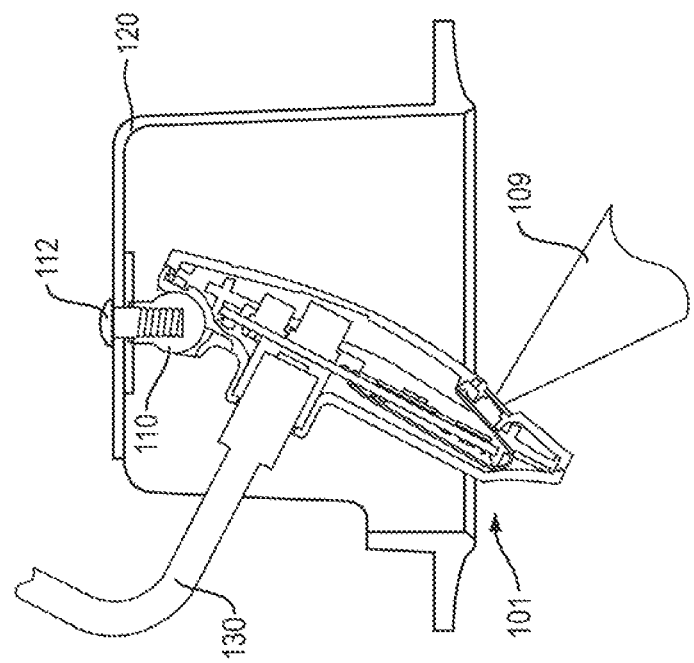
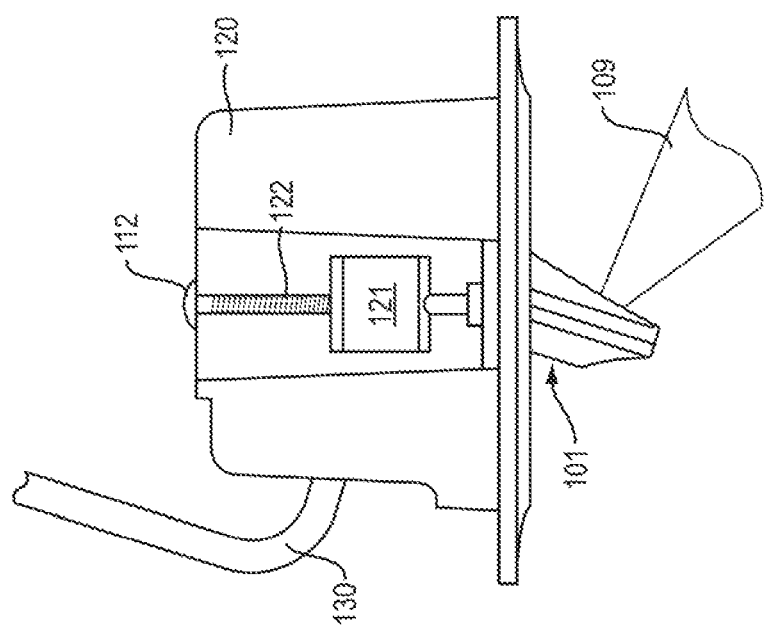

SURVEILLANCE CAMERA HAVING INTEGRATED ASSEMBLY FEATURES

BACKGROUND OF THE INVENTION

Surveillance system cameras are installed in many different environments and are used to monitor or record areas of interest or for general security purposes. Example systems often employ a camera attached to a support member and provide a field of view capturing areas of interest in an environment. Surveillance system cameras capture video or still imagery and store that information locally or allow it to be viewed and recorded remotely. Prior art camera systems often require a specialized mounting apparatus for the camera to be secured to a location to provide the desired view. Such prior art systems are also often easily identified as a camera apparatus, which is sometimes on purpose as a deterrent.

In the video security industry, there exists a class of cameras that are rectangular and only about the size of a credit card. Sometimes cameras in this class are referred to as cube cameras. These cube cameras usually feature a fixed-mounted lens and integrated circuitry in a camera housing. They differ from two other classes of cameras, box and dome cameras, by their relatively small form factor. When box or dome cameras are mounted to a drop-down ceiling or a dry walled ceiling with a traditional security camera mount, the installation occupies a lot of space with the relatively small camera body and cabling.

SUMMARY OF THE INVENTION

An embodiment of the present invention is a surveillance camera comprising a camera assembly and a rotary joint assembly integrated into a housing of the camera assembly. The rotary joint assembly enables rotation of the camera assembly about a spherical surface of the rotary joint assembly. The rotary joint assembly includes a first mating component adapted to couple to a standard-sized threaded second mating component. The rotary joint assembly is configured to self-support the camera assembly in arbitrary orientations relative to an orientation of the second mating component.

The rotary joint assembly may be a ball joint assembly. In the embodiment, the housing of the camera assembly has a profile with a length, width, and depth; the camera assembly has a center of gravity located between a first end and a second end of the length of the camera assembly; and the rotary joint assembly may be integrated into the housing at the first end of the housing.

The surveillance camera may further include a first mating feature and a second mating feature, where the mating features may be arranged to prevent rotation of the first mating component with respect to the second mating component after mating.

The camera assembly may include a camera sensor having a camera lens with a viewing angle relative to a face of the camera assembly. The rotary joint assembly may be located at a first end of the camera assembly, and the viewing angle is in a direction angularly outward from a second end of the camera assembly, with the first and second ends being laterally opposed from each other. In this embodiment, the camera lens is angled approximately 68-74° relative to parallel of a face of the camera assembly spanning between the first and second ends of the camera assembly. In this embodiment, the camera sensor may have a resolution of at least 640×480 pixels.

The camera assembly may also include a light emitting diode (LED) connected to said circuit board assembly, where the LED is configured to be visible, when illuminated, by an observer through a continuous portion of a front panel of the camera assembly.

The camera assembly may include a camera sensor and an interface to transmit representations of images captured by the camera sensor, the interface being a wireless interface or a wired interface.

The surveillance camera may also include a domeless recessed housing assembly with the second mating component, where the recessed housing assembly is configured to support the camera assembly in a ceiling hole and at least partially surrounds the camera assembly without obstructing a field of view of the lens at the camera assembly when the camera assembly is installed into the recessed housing assembly. In this embodiment, the camera assembly, in the majority, is within the domeless recessed housing assembly in an installed state, with the viewing angle of the lens being angularly downward while the camera assembly is in a vertical orientation within the domeless recessed housing assembly.

The surveillance camera may alternatively include an L-bracket. The first mating component of the rotary joint assembly connects the surveillance camera to the L-bracket through use of the second mating component, with the L-bracket being configured to attach securely to a support surface through use of a fastener.

In another embodiment, the surveillance camera includes a camera assembly having a housing and a fixed-angle camera lens. The fixed-angle camera lens defines a viewing angle non-perpendicular to an assembly face of the housing associated with the camera lens.

The fixed-angle camera lens is angled in a direction non-perpendicular to approximately 68-74° relative to parallel of a major plane of the camera assembly. Faces of target people are visible within a field of view of the fixed-angle camera lens between 6 and 37 feet from a wall to which the camera assembly is mounted in parallel arrangement against an assembly face on an opposite side of the camera assembly from an assembly face from which the lens views the target people.

In yet another embodiment, a surveillance camera comprises a camera assembly including a housing having a front panel with a port for a camera lens and includes a light emitting diode (LED), the LED being visible, when illuminated, through a thickness of a continuous material of the front panel of the camera assembly.

In this embodiment, the front panel with a paintable surface may be removable. The front panel may match a color of an adjacent wall or surface. The front panel may match a texture of an adjacent wall or surface.

In still a further embodiment, a surveillance camera comprises a camera assembly and a domeless recessed housing assembly. The domeless recessed housing assembly is configured to support the camera assembly in a ceiling hole, and, in an installed state, the camera assembly, in a majority, is within the domeless recessed housing assembly. The camera assembly has a lens with a viewing angle being angularly downward while the camera assembly is in a vertical orientation within the domeless recessed housing assembly.

In still a further embodiment, a surveillance camera comprises a camera assembly having a front side and reverse side. The front side defines a port for a camera lens for capturing images of a scene, and the front side also includes a status indicator operable to be illuminated. The surveillance camera also includes a cover configured to attach to the camera assembly across at least a portion of at least the front side. The cover provides a port for the camera lens to view the scene unobstructed, and the cover obscures viewing of the status indicator during periods of non-illumination and enables viewing of the status indicator during periods of illumination.

In this embodiment, a deface of visibility by an observer of the status indicator during illumination may be a function of thickness of the cover at the status indicator between the status indicator and the observer.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-C show embodiments of the present invention in an example environment.

FIGS. 2A-B are cut-through views of the camera assembly and recessed housing in an installed configuration.

FIG. 5 is an exploded view of the camera assembly showing internal components.

FIGS. 6A-C are cut-though views of the camera assembly and rotary joint assembly.

FIGS. 8A-D are detailed views of the rotary joint assembly integrated into the camera assembly.

FIGS. 11A-B are exterior and cut-through views of the camera assembly mounted in a recessed housing and articulated opposite to the orientation shown in FIGS. 10A-B.

DETAILED DESCRIPTION OF THE INVENTION

A description of example embodiments of the invention follows.

Embodiments of the invention are useful for discreetly providing surveillance monitoring in a public area, such as through mounting a surveillance camera in a ceiling and hiding part of the camera and its cabling. In some embodiments a rotary joint assembly, such as a ball joint assembly, at one end of the camera assembly allows a camera assembly to be adjusted while mounted inside a recessed housing assembly.

A former approach may mount the surveillance camera directly to the ceiling with a screw without a traditional camera mount. A disadvantage of such an approach is that the surveillance camera still hangs quite low with a visible cable connected to the camera. In addition, it is not easy to adjust the surveillance camera-viewing angle without an adjustable traditional camera mount.

An embodiment of the present invention is a surveillance camera able to be installed in a ceiling by way of a recessed housing assembly or against a support surface with less visually occupied space. An embodiment of the present surveillance camera system is able to hide part of the camera assembly in a drop-down ceiling or a dry-walled ceiling by recessing the mounting point using a recessed housing assembly, which is also able to hide any associated cabling. The installed camera assembly with the ceiling support accessory may be configured to look similar to a recessed lighting fixture or an automatic fire sprinkler on a ceiling.

Figure 1A:
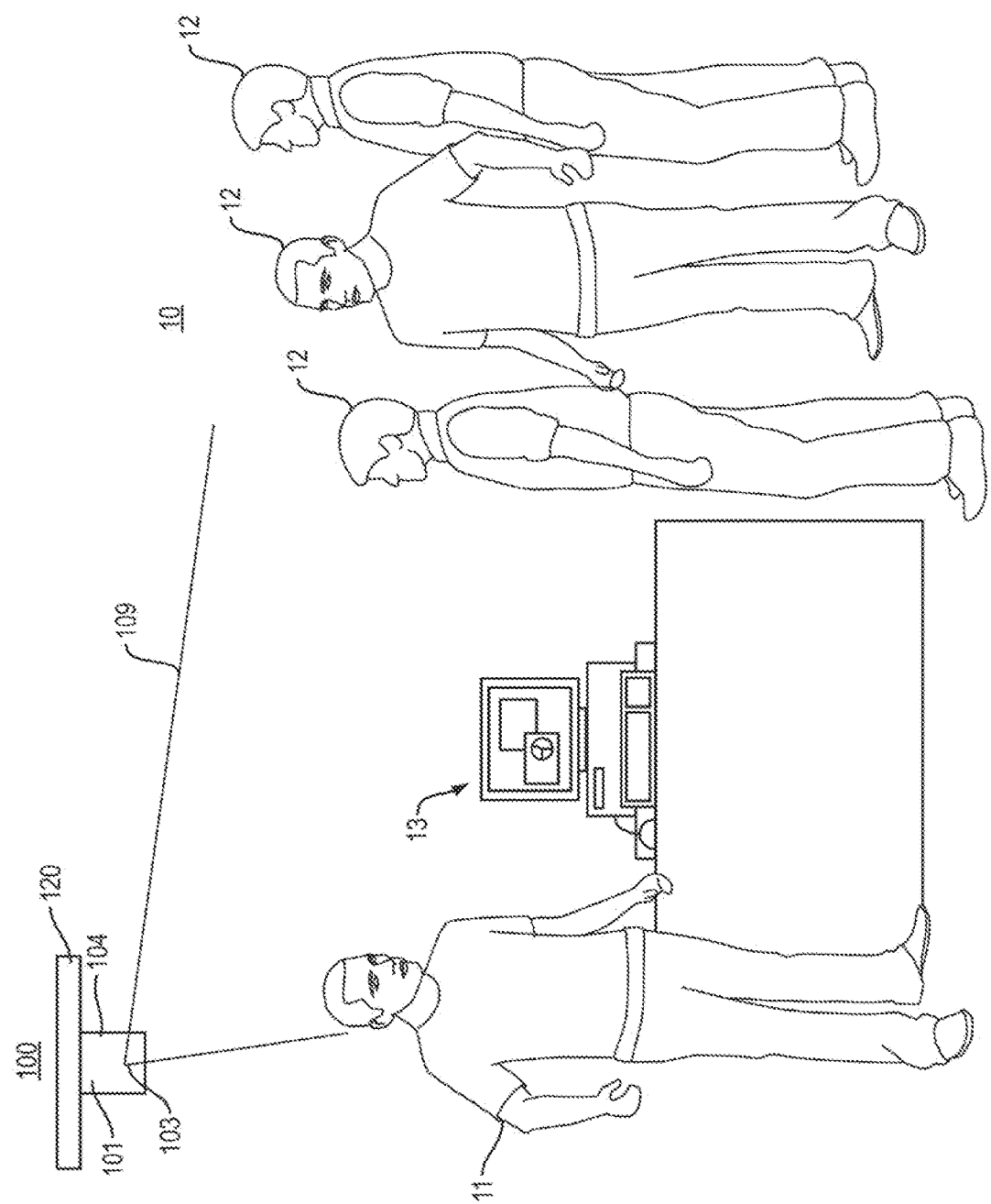

FIG. 1A is an example application of an embodiment of the present invention. FIG. 1A shows elements of a system 100 installed in a retail environment 10. A camera assembly 101 is installed in a recessed housing assembly 120 that is installed in a ceiling opening. The recessed housing assembly 120 is similar to those typically used for recessed lighting application. The camera assembly 101 has a lens 103 with a field of view 109 tailored to the specific application environment; in this application, the field of view observes both the employee 11 and patrons 12 in this retail environment 10. The camera assembly 101 also includes a status indicator, such as a light emitting diode (LED) 104. In this embodiment, the LED 104 is only visible on the camera assembly 101 when illuminated. LED 104 is able to indicate a fault with the camera assembly 101 or otherwise provide a status indication, by being illuminated or not illuminated, or by blinking. The LED 104 may be activated by a controller to enable a technician to identify a particular camera assembly 101 from among multiple camera assemblies, at a given location.

FIG. 1B shows a back view of the camera assembly 101. The camera assembly 101 has an integrated all joint 110 (a type of rotary joint 110, which may alternatively be a dual-axis joint or other multi-axis joint) with an associated mating component 111. Some embodiments include an integrated adjustable ball joint assembly 110 in the camera assembly 101. The ball joint assembly 110 mating component 111 can be a screw-threaded hole configured to attach to a standard support accessory, like a ¼-20 threaded rod or screw. The ball joint assembly can be made in any material to support a snug-fit connection that can hold (i.e., self-support) the weight of the camera assembly and the cabling without changes to the camera orientation.

The ceiling support accessory can be made by molded plastic or metal similar to a recessed lighting fixture. The ball joint assembly with integrated mating component allows attachment to a corresponding mating component. Such corresponding mating components can be included in the recessed housing assembly or can allow attachment to a wall or support member (e.g., pipe) by way of an L-bracket, and still give enough room to point the camera in a wide choice of rotation or downward angles, providing pan and tilt angles options because of the integrated ball joint.

The camera assembly 101 also includes, in a wired configuration, a data communications port 106 allowing sending and receiving electronic signals, as well as powering the camera assembly 101.

Figure 1C:
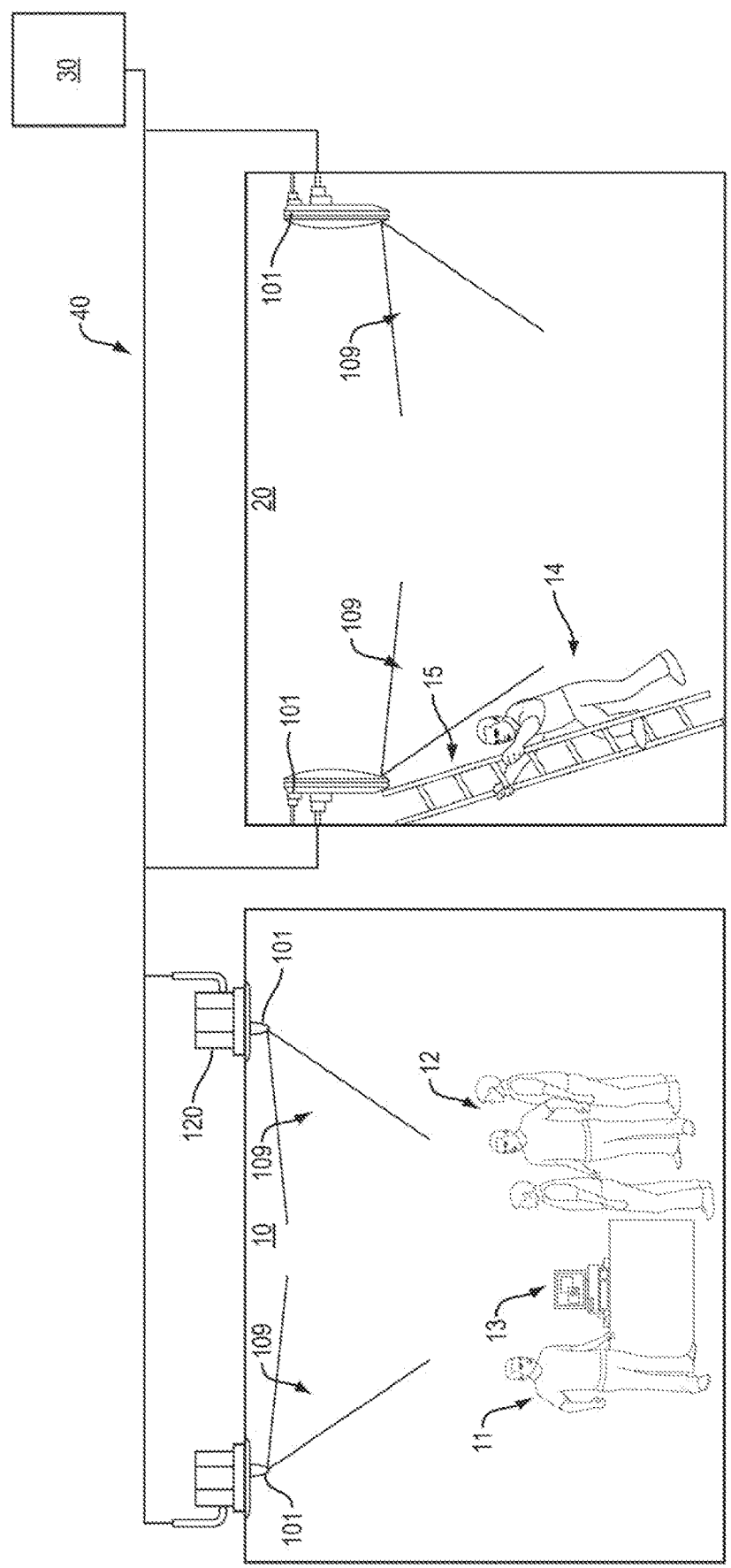

FIG. 1C shows multiple camera assemblies 101 installed in multiple locations and linked by a network 20 to a central gateway 30. In a retail environment 10, camera assemblies 101 are installed in recessed housing assemblies 120 and configured to have fields of view 109 to observe employee 11 and customers 12 at a register 13. The same location has a room 20 where camera assemblies 101 are mounted to the walls in a vertical orientation to have fields of view 109. Installer 14 can use a ladder 14 and a simple tool, such as a Phillips head screwdriver, to enable adjustment and installation of the camera assemblies 101. By way of the gateway 30 and network 40, the camera assemblies 101 can interface with a remote location or device also connected to gateway 30. Notably, because of such ease of installation, installation times are significantly reduced compared to current surveillance systems. In the case of the integrated rotary joint assembly embodiment, for example, installing the surveillance camera and mechanical adjustment assembly can be done through single screw-socket connection, as compared to previous installations of bulky mechanical arms with rotary joint to which the camera would be affixed. Embodiments of the present invention can be used as part of a cloud-based video surveillance management system. One such system is described in U.S. application Ser. No. 13/335,591, herein incorporated by reference in its entirety.

FIGS. 2A and 2B are side and back views of the camera assembly installed in a recessed housing assembly. FIG. 2A shows a cut through of both the camera assembly 101 and the recessed housing assembly 120. The camera assembly 101 is affixed to the recessed housing assembly 120 by means of a first mating component 111 and a second mating component 112. The mating component 111 is integrated with the ball of the ball joint assembly 110. The ball joint assembly 110 is integrated into one end of the camera assembly 101, and the lens 103 and LED 104 are integrated into the opposite end of the camera assembly 101. Also shown is the circuit board 105 of the camera assembly 101, to which the communications port 106, camera sensor 102, and LED 104 are connected. The viewing angle of the camera lens is adjustable through articulation of the ball joint assembly positioning mechanism.

The camera assembly 101 is simplified and able to have a slim profile by using a small camera sensor 102, similar to those found in cellular phones, and employs a single PCB 105 board to forego any inter-board connections, which provide significant weight reduction, as well. Power can be provided to the camera assembly 101 by way of the communications port 106. The simple design of the camera assembly allows solar cells that collect local lighting to be a viable power source.

Figure 3B:
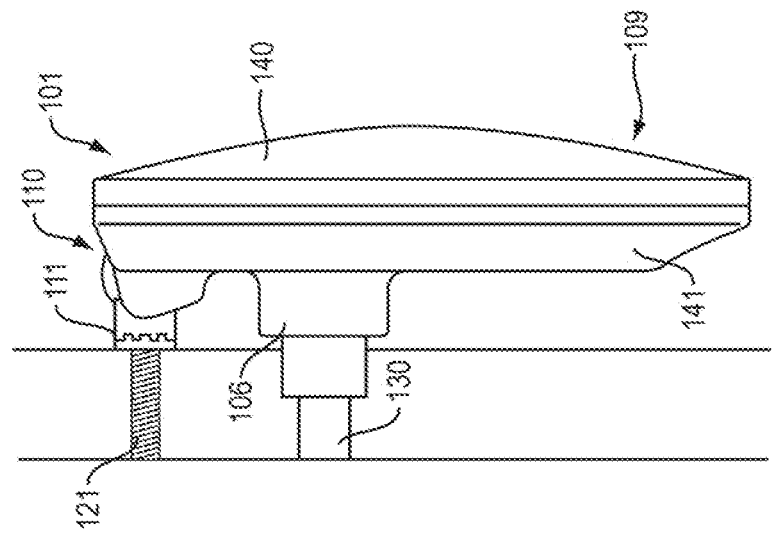
FIGS. 3A-B are view of the camera assembly installed in a vertical orientation.
Figure 3A:
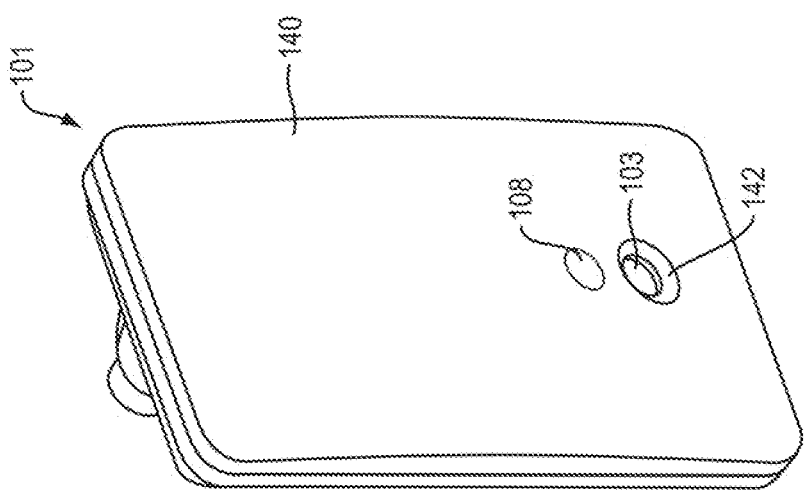

FIG. 2B shows a cut-through view of the recessed housing assembly 120 and a back view of the camera assembly 110. The recessed housing assembly 120 is configured to be secure in a ceiling opening or other support surface opening by means of support surface clips 121 or swing-able flaps attached to the recessed housing assembly 120. The mating component 111 and corresponding mating component 112 affix the camera assembly 120 to the recessed housing assembly 120. In this example, the ball joint 110 has both a threaded mating component 111 and a threaded corresponding mating component 112. The threaded mating component may be designed to accept a standard corresponding mating component, such as a ¼-20 threaded screw or threaded rod. It should be understood that other form of mating components known in the art may be employed. The term "threaded" may be replaced with equivalent terms herein when other mating components are employed FIGS. 3A and 3B illustrate an embodiment of the present invention in a vertical configuration. FIG. 3A shows the camera assembly 101 front face 140 that includes an opening 142 for the camera lens 103 and a region of thin material 108 behind which the LED 104 is visible when illuminated. FIG. 3B shows a side view of the camera assembly 101 and a vertical position, supported by a corresponding mating component 121 attached to the mating component 111 of the ball joint 110. The viewing angle 109 of the camera lens is fixed with respect to the camera assembly at an angle suitable for observing standard surveillance camera environments at a standard height. The angle typically ranges between 68 and 74 degrees as measured against vertical. The camera assembly 110 has both a front panel 140 and a rear panel 141; the rear panel 141 provides openings for both the communications port 106 and ball joint assembly.

Figure 4A:
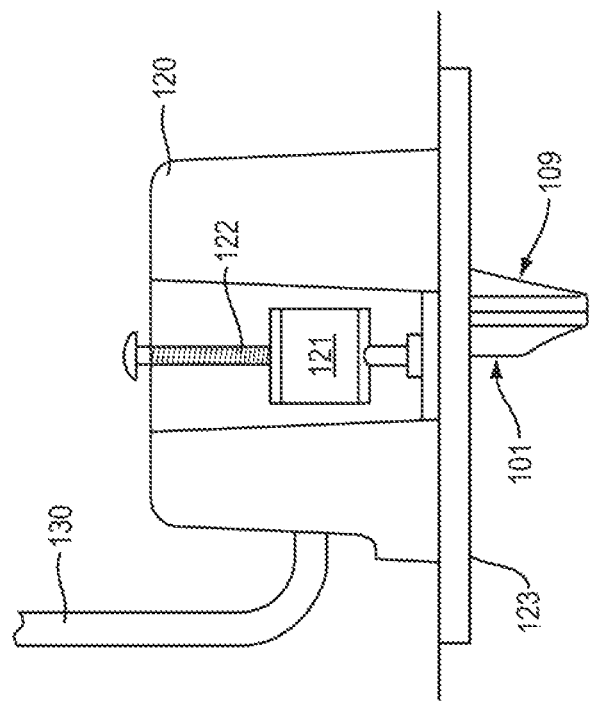
FIGS. 4A-B are external views of the camera assembly installed in the recessed housing assembly having two different flange profiles.
Figure 4B:
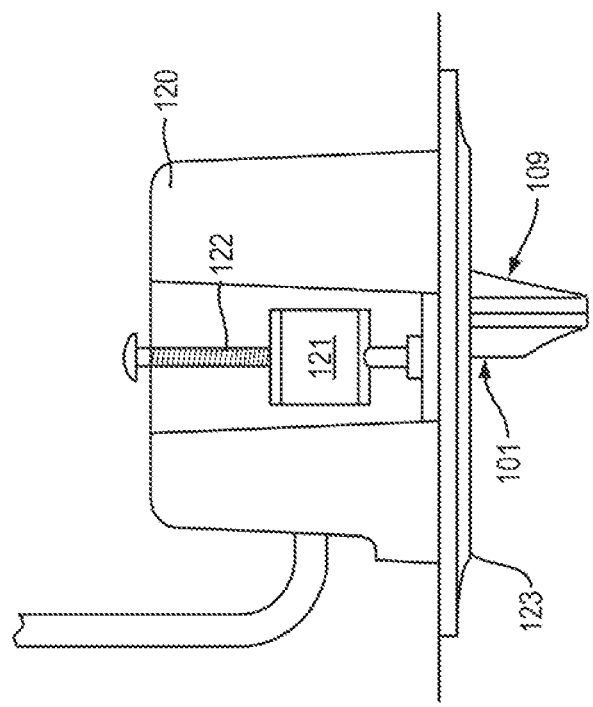

FIGS. 4A and 4B show the camera assembly installed in a recessed support housing assembly 120. FIG. 4A is an external view of the recessed housing assembly 120 with the camera assembly 101 installed position such that the field of view 109 of the camera lens 103 of the camera assembly 101 clears the inner edge of the flange 123 of the recessed housing assembly 120. The recessed housing assembly 120 also allows choice of pan and tilt angles when the camera assembly 101 is installed, and still hides away the cabling 130, without requiring complex dome designs. The term "domeless" is used herein to refer to the recessed housing assembly 120. Compared to the current practice in mechanical and electrical designs of dome cameras, this is a significantly more simple design without the need for a camera assembly designed specifically for a dome or recessed camera housing. Moreover, current ceiling mounted dome cameras require complex mounting and rotation mechanism to achieve the same functionally as the domeless embodiments disclosed herein.

FIG. 4B shows recessed housing assembly 120 and camera assembly 101 in a different configuration, whereby the flange 123 of the recessed housing assembly has a different profile.

FIG. 5 shows an exploded view of the camera assembly 101. Shown are the various components internal components of the camera assembly 101 and ball joint assembly 110, including a camera sensor 104 and a PCB 105 with attached communications port 106. The communications port can be an RJ45 connector or another standard connection port. The PCB receives video signals from the camera sensor 104 and is able to illuminate the LED. The camera assembly 101 circuit board 105 is contained by the front plate 140 and a rear plate 141. The ball joint assembly includes a ball 152 with a socket 151 integrated into the rear plate 141. The ball 152 is held into the socket 151 with socket fingers 157. The ball joint 110 is prevented from being disassembled by way of a ball joint plate 153 affixed to the camera assembly by screws 154.

FIG. 6A shows a cut through view of the camera assembly 101 and ball joint assembly 110. The front plate 140 of the camera assembly 101 has an opening 142 for the camera lens 102 and a region of thin material 108 to allow the LED 104 to be observed through the front plate 140 when the LED is illuminated. The data cable 130 is connected to the communications port 106.

FIGS. 6B and 6C are orthogonal cross-sections of the camera assembly 101 showing the position of circuit board 105.

Figure 7B:
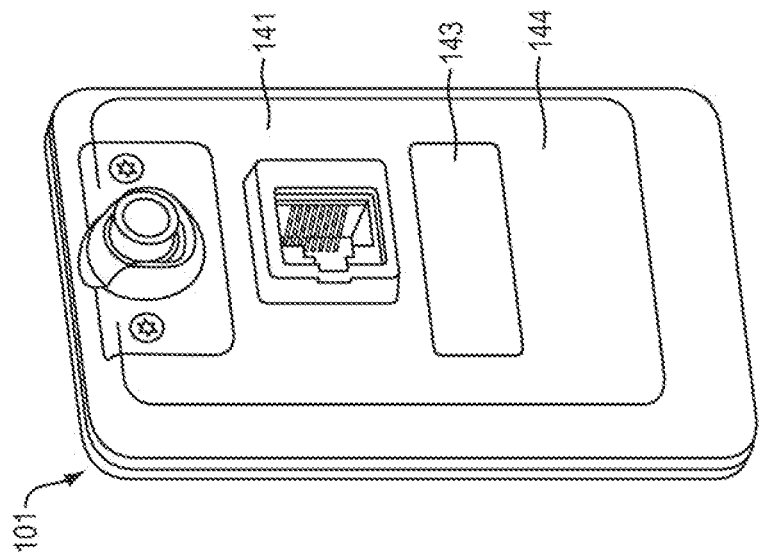
FIGS. 7A-B are views of the front and back panel of the camera assembly showing exterior details.
Figure 7A:
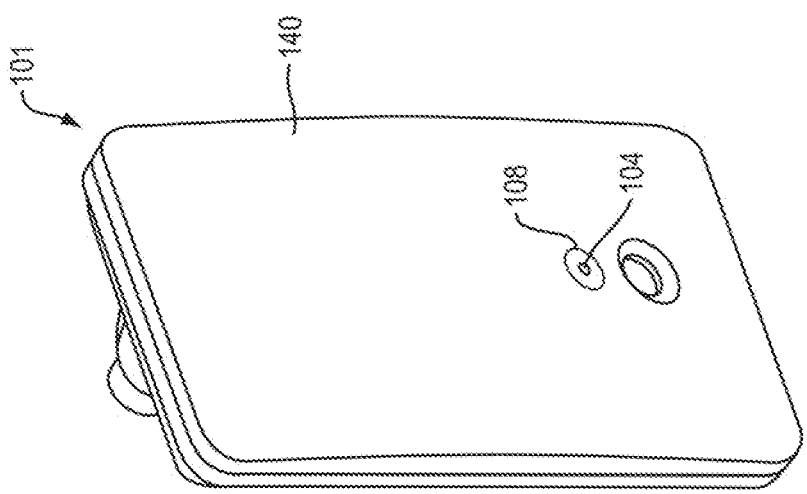

FIG. 7A shows the camera assembly 101 front face 140 with illuminated LED 104 visible through the region of thin material 108. FIG. 7B shows the camera assembly 101 rear panel 141 including an opening to make visible a rear panel LED 144. The rear panel 141 also includes a label region 143 for affixing device certification or network address information.

FIG. 8A shows a ball joint assembly 110 integrated into the back panel 141 of a camera assembly 101. FIG. 8B shows a cross-section of the camera assembly 101 and integrated ball joint assembly 110. A mating component 111 has threads 156 to accept a threaded corresponding mating component.

Figure 8D:
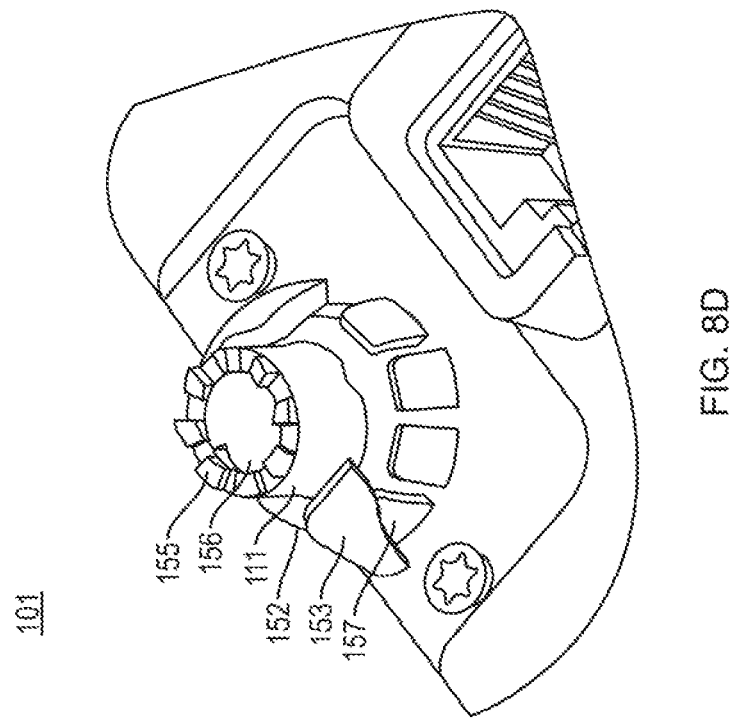
Figure 8C:
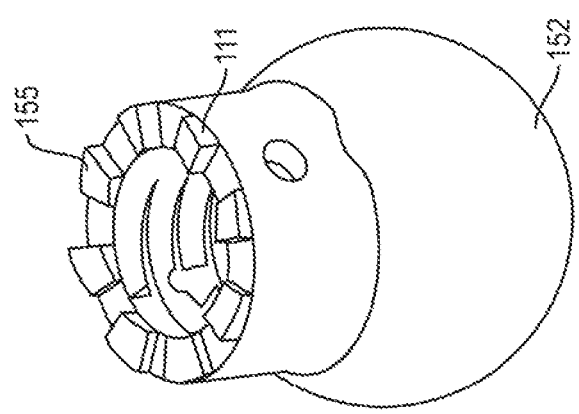

FIG. 8C is an isolated view of a ball 152 having an integrated first mating component 111 having mating features 155, shown here as locking teeth preventing rotation of a second mating component (not shown). The mating features 155 ensure the mating components 111 and the recessed housing assembly 120 or the L-bracket 160 do not rotate relative to each other when securing a threaded second mating component 112. FIG. 8D is a detailed view of a ball joint 110 with a see-through ball joint plate 153 to show fingers 157 holding a ball 152 in socket 151 with sufficient static friction to self-support the weight of the camera assembly 101 in arbitrary orientations.

Figure 9B:
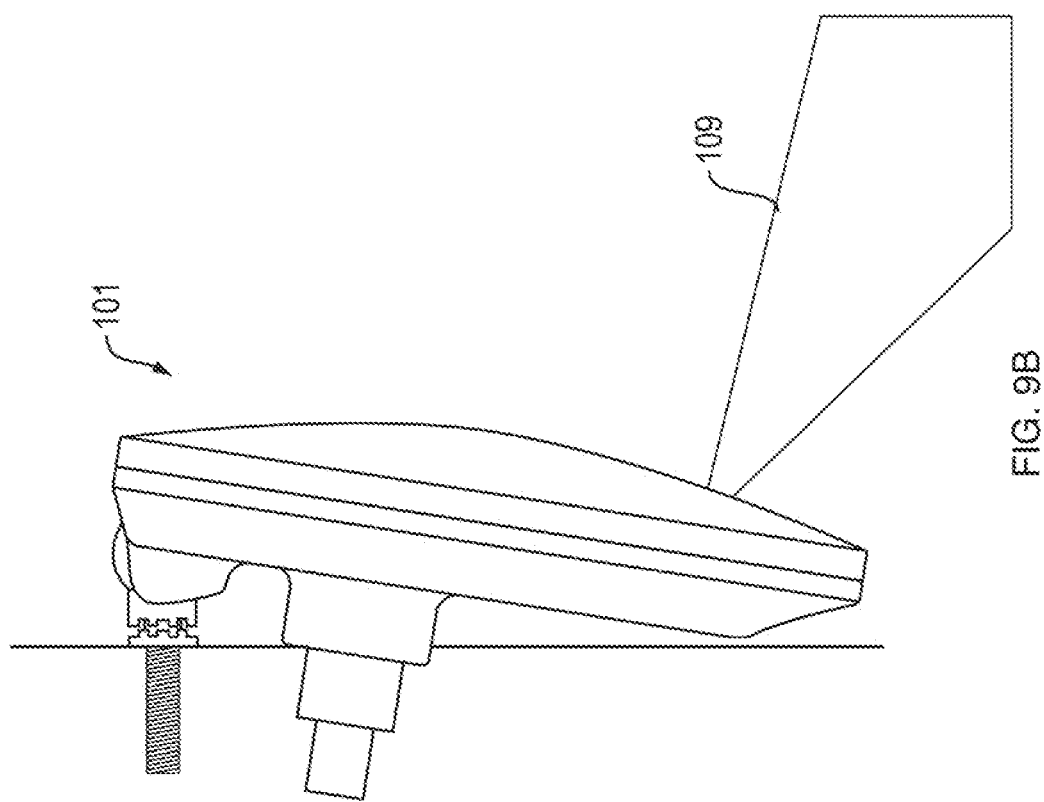
FIGS. 9A-B are views of the vertically mounted camera assembly.
Figure 9A:
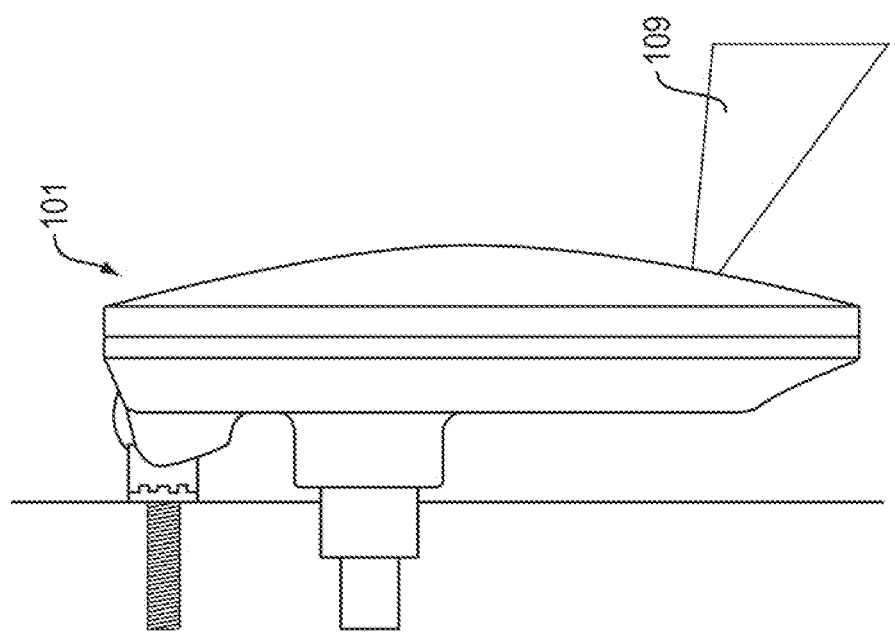

FIG. 9A shows a camera assembly 101 mounted in a vertical orientation and having a field of view 109. FIG. 9B shows the camera assembly 101 of FIG. 9A rotated to a downward angle and the resulting change in the orientation of the field of view 109.

Figure 10B:
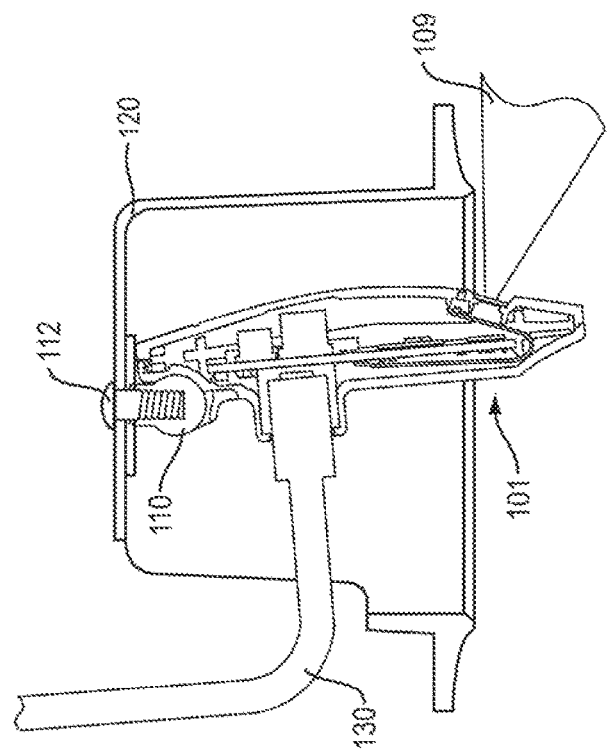
FIGS. 10A-B are exterior and cut-through views of the camera assembly mounted in a recessed housing and articulated towards one side of the housing.
Figure 10A:
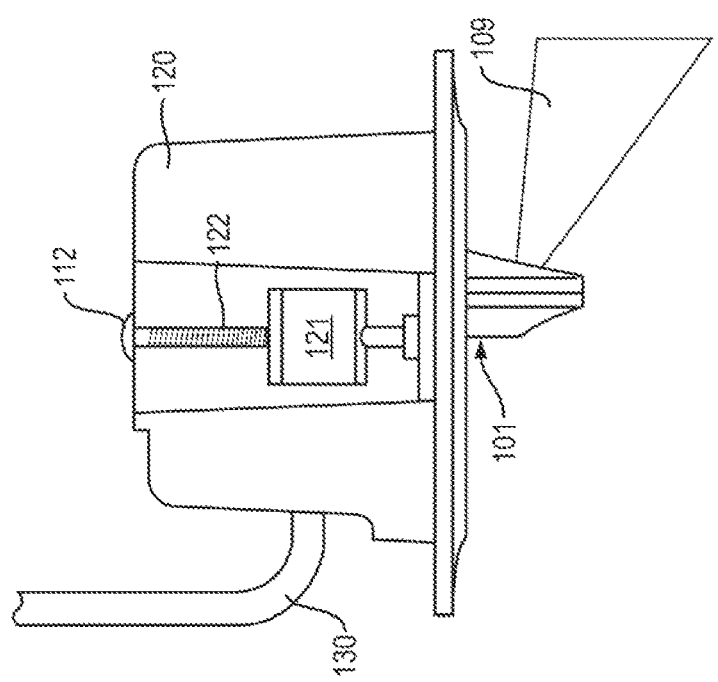
Figure 12A:
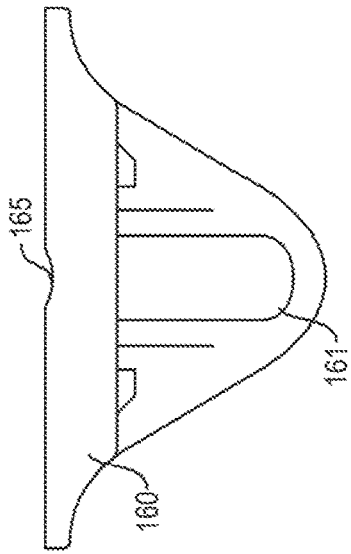
FIGS. 12A-12D show an L-bracket in various orientations.
Figure 12B:
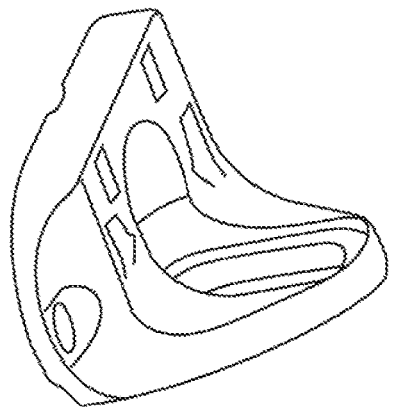
Figure 12C:
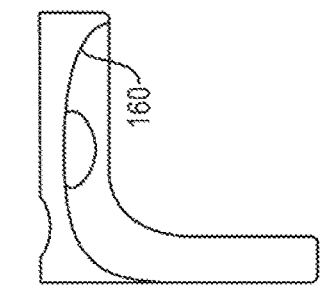
Figure 12D:
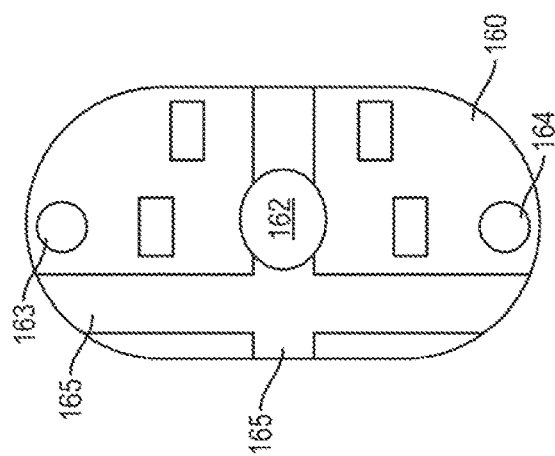

FIG. 10A shows a camera assembly 101 installed into a recessed housing assembly 120 in a vertical orientation. FIG. 10B shows a cross section of the camera assembly 101 and recessed housing assembly 120 of FIG. 10A rotated into a forward position.

FIG. 11A shows a camera assembly 101 and recessed housing assembly 120 of FIG. 10A, but with the camera assembly 101 in a different orientation and the resulting change in angle of the field of view 109. FIG. 11B shows a cross section of the camera assembly 101 and recessed housing assembly of FIG. 11A. Seen here is the ball joint assembly 110 supporting the camera assembly 101 in the different orientation and fixed to the recessed housing assembly 120 by the second mating component 112 inserted into the ball joint assembly 110.

FIG. 12 shows multiple views of an L-bracket 160 having grooves 165 for mating the L-bracket 160 against a rounded support member. The L-bracket 160 also includes a circular opening 162 and slotted opening 161 for securing a camera assembly 101 (shown in FIG. 1B) to the L-bracket 160 with a corresponding mating component 112 (not shown). The L-bracket 160 also includes holes 163 for securing the L-bracket 160 to a support surface or rounded support member with fasteners.

Figures 13A, 13B:
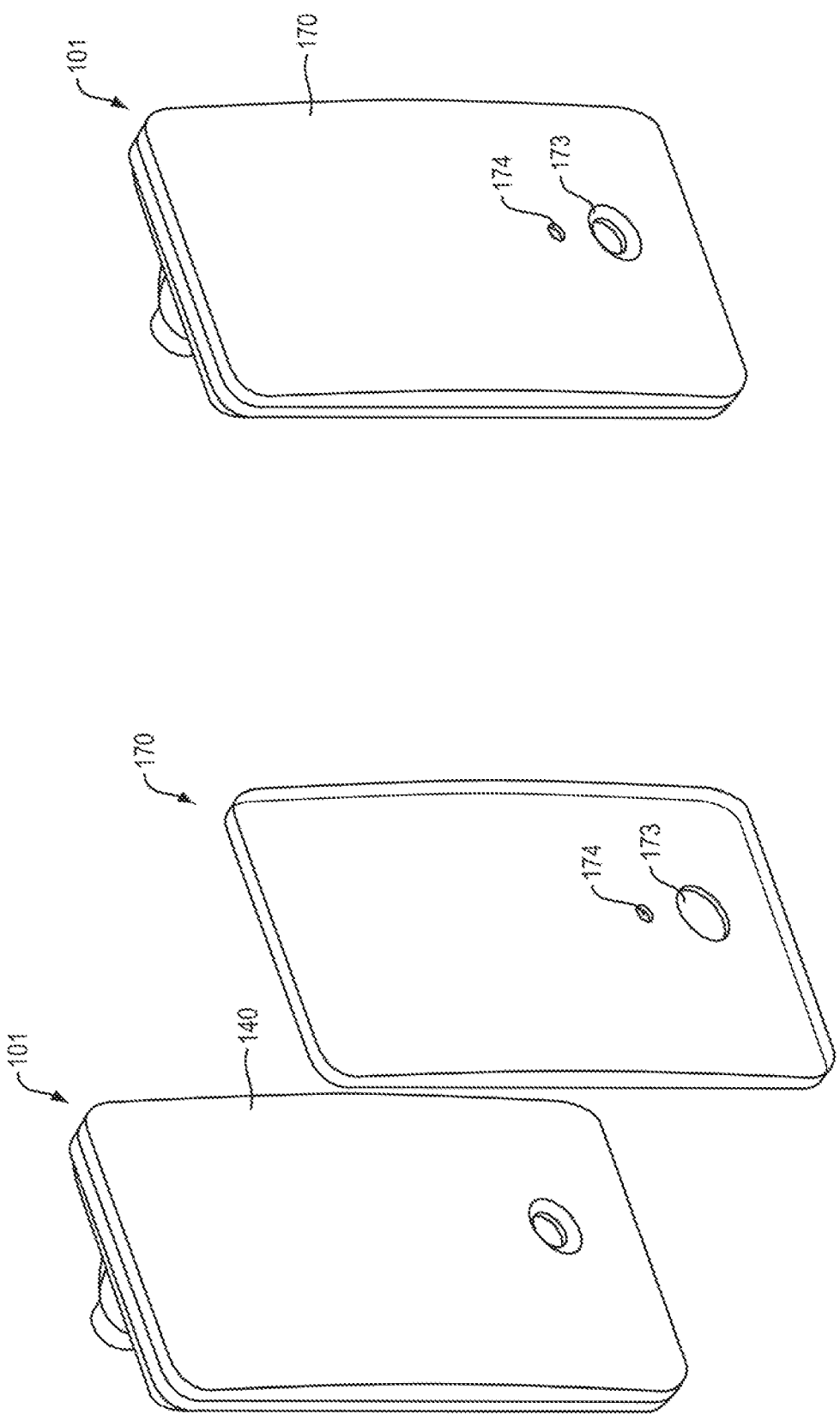
FIGS. 13A-13B show a cover attachment to the camera assembly.

FIG. 13A shows the camera assembly 101 with a front panel cover 170. The front panel cover 170 fits on the camera assembly 101 and covers the front panel 140 with a surface able to be painted to blend the camera assembly 101 into an environment or to otherwise obscure or protect front panel 140. Front panel cover 170 has a camera opening 173 to prevent obstructing the camera lens 103 (shown in FIG. 2A) and an optional LED opening 174 to allow LED 104 (shown in FIG. 2A) to be visible, when illuminated, when the front panel cover 170 is installed on the front panel 140. FIG. 13B shows front panel cover 170 installed onto a camera assembly 101.

Figure 14B:
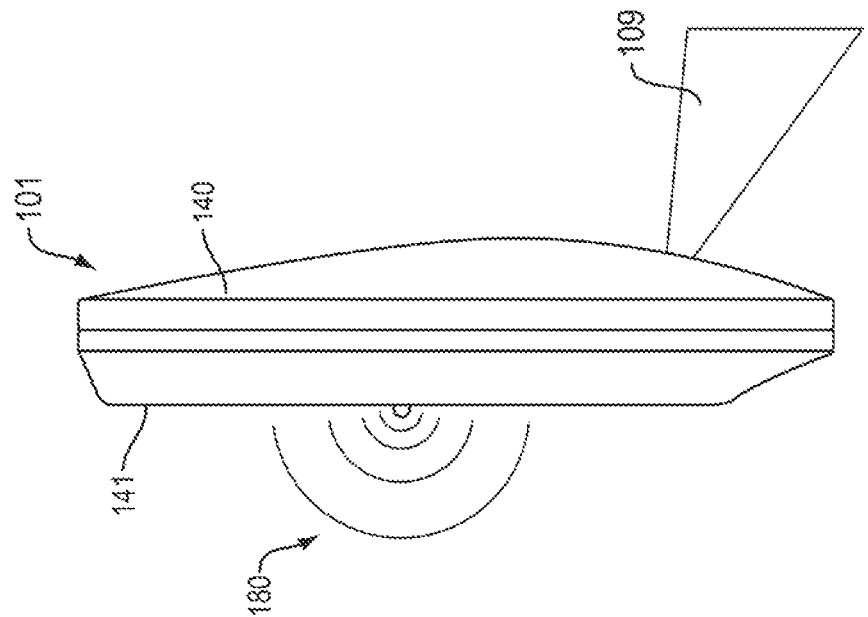
FIGS. 14A-B show a camera assembly without a rotary joint.
Figure 14A:
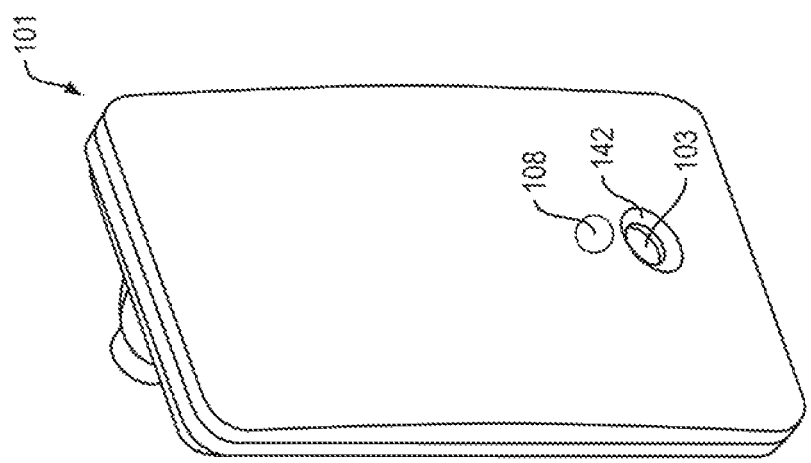

FIG. 14A shows an embodiment of the camera assembly 101 without a rotary joint assembly. FIG. 14B shows the camera assembly 101 of FIG. 14A configured to send and receive representations of electronic signals 180 wirelessly without a wired communications port 106 and associated cable 130. The camera assembly 101 can receive power wirelessly by induction, or by an attached power cable (not shown).

While this invention has been particularly shown and described with references to example embodiments thereof, it will be understood by those skilled in the art that various changes in form and details may be made therein without departing from the scope of the invention encompassed by the appended claims.

What is claimed is:

1. A surveillance camera configured to be positioned within a recessed domeless housing having an open end, the surveillance camera comprising:
   a camera assembly including a camera housing having a first end configured to be at least partially received into the open end of the recessed domeless housing and partially surrounded thereby, and a second opposing end configured to at least partially protrude from the open end in an installed state; and
   a rotary joint assembly comprising a ball and socket integrated into an exterior of the camera housing at the first end, said rotary joint assembly enabling rotation of the camera housing about an axis of the rotary joint assembly and including a first mating component configured to couple to a second mating component within the recessed domeless housing, said socket of said rotary joint assembly including socket fingers configured to self-support the camera assembly in arbitrary orientations relative to an orientation of the second mating component.

2. The surveillance camera of claim 1, wherein said camera assembly further comprises:
   a camera sensor positioned near the second end and having a camera lens having a viewing angle being in a direction angularly outward from the second end of said camera assembly housing.

3. The surveillance camera of claim 2, wherein the viewing angle is in a range of approximately 68-74 degrees relative to parallel of a face of the camera assembly spanning between the first and second ends of said camera assembly.

4. The surveillance camera of claim 2, wherein the camera sensor has a resolution of at least 640.times.480 pixels.

5. The surveillance camera of claim 1, wherein said camera assembly further comprises a light emitting diode (LED) connected to said circuit board assembly, said LED configured to be visible, when illuminated, by an observer through a continuous portion of a front panel of said camera assembly.

6. The surveillance camera of claim 1, wherein the domeless recessed housing with the second mating component is configured to support said camera assembly in a ceiling hole.

7. The surveillance camera of claim 6, wherein the camera assembly, in a majority, is positioned within and surrounded by the domeless recessed housing in an installed state, and the viewing angle of the lens is angularly downward with the camera assembly in a vertical orientation within the domeless recessed housing.

8. The surveillance camera of claim 1, wherein the first mating component of said ball of said rotary joint assembly comprises a threaded hole and the second mating component comprises a threaded rod.

9. The surveillance camera of claim 8, wherein said first mating component further comprises locking teeth to prevent rotation of the second mating component.

10. The surveillance camera of claim 1, wherein the ball and socket of said rotary joint assembly are configured to enable rotation of the camera assembly housing about an axis of the rotary joint assembly when said first mating component of said ball of said rotary joint assembly is coupled to said second mating component.

* * * * *